United States Patent
Jinbo

(10) Patent No.: US 8,579,298 B2
(45) Date of Patent: Nov. 12, 2013

(54) SEALING DEVICE

(75) Inventor: Kazunori Jinbo, Kitaibaraki (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 13/809,648

(22) PCT Filed: Feb. 22, 2012

(86) PCT No.: PCT/JP2012/054305
§ 371 (c)(1),
(2), (4) Date: Jan. 11, 2013

(87) PCT Pub. No.: WO2012/132659
PCT Pub. Date: Oct. 4, 2012

(65) Prior Publication Data
US 2013/0099450 A1    Apr. 25, 2013

(30) Foreign Application Priority Data

Mar. 31, 2011    (JP) .................................. 2011-078089

(51) Int. Cl.
*F16J 15/32*    (2006.01)
(52) U.S. Cl.
USPC ........................................ 277/559; 277/560
(58) Field of Classification Search
USPC .................................................. 277/559–560
See application file for complete search history.

(56) References Cited

U.S. PATENT DOCUMENTS

| | | | | |
|---|---|---|---|---|
| 3,640,542 A | * | 2/1972 | Mowat et al. ................. | 277/559 |
| 4,061,346 A | * | 12/1977 | Coleman et al. .............. | 277/439 |
| 4,560,177 A | * | 12/1985 | Riley, Jr. ....................... | 277/558 |
| 4,964,647 A | * | 10/1990 | Stephan ........................ | 277/560 |
| 5,507,505 A | * | 4/1996 | von-Arndt et al. ............ | 277/560 |
| 5,664,651 A | * | 9/1997 | Miura et al. ............. | 188/322.17 |
| 2004/0119244 A1 | * | 6/2004 | Duke et al. .................... | 277/549 |
| 2008/0217865 A1 | * | 9/2008 | Sedlar et al. .................. | 277/572 |

FOREIGN PATENT DOCUMENTS

| | | |
|---|---|---|
| JP | 2592489 B | 12/1996 |
| JP | 11-311337 A | 11/1999 |
| JP | 2005-221019 A | 8/2005 |
| JP | 2006-322528 A | 11/2006 |
| JP | 2008-101704 A | 5/2008 |

OTHER PUBLICATIONS

International Search Report (Japanese and English) and Written Opinion of the ISA (Japanese) for PCT/JP2012/054305, ISA/JP, mailed Apr. 10, 2012.

* cited by examiner

*Primary Examiner* — Vishal Patel
(74) *Attorney, Agent, or Firm* — Harness, Dickey & Pierce, P.L.C.

(57) ABSTRACT

In a section passing through a central axis of the annular sealing device 100, if a radius of curvature of a curved face between a first inclined face 110X and a second inclined face 110Y is R0, a radius of curvature of a curved face between a side face on a sealed fluid side (O) and the first inclined face 110X in an annular groove is R1$a$, R2$a$, R3$a$, and R4$a$ for respective annular grooves, and a radius of curvature of a curved face between a side face on an atmosphere side (A) and the first inclined face 110X in an annular groove is R1$b$, R2$b$, R3$b$, and R4$b$ for the respective annular grooves, R1$b$, R2$b$, R3$b$, R4$b$<R0<R1$a$, R2$a$, R3$a$, R4$a$ is satisfied.

7 Claims, 1 Drawing Sheet

SEALING DEVICE

CROSS-REFERENCE TO RELATED APPLICATIONS

This application is a 371 U.S. National Stage of International Application No. PCT/JP2012/054305, filed Feb. 22, 2012, which claims priority to Japanese Patent Application No. 2011-078089, filed Mar. 31, 2011. The disclosures of the above applications are incorporated herein by reference.

TECHNICAL FIELD

The present invention relates to a sealing device for sealing an annular gap between two members reciprocating with respect to each other.

BACKGROUND ART

Conventionally, there is a known technique of forming a plurality of annular grooves in a sliding face of a seal lip in a sealing device for reciprocation in order to reduce frictional resistance. Moreover, in order to suppress reduction in a sealing property due to the plurality of annular grooves formed in this manner, there is a known technique of forming opposite side faces of each of the respective annular grooves at different inclination angles with respect to the sliding face to return sealed fluid such as oil to a sealed fluid side (see Patent Literature 1). This is a technique in which an edge between the side face on an opposite side from the sealed fluid side and the sliding face in the annular groove is formed to have a smaller angle than an edge between the side face on the sealed fluid side and the sliding face. With this technique, a returned amount of the sealed fluid to the sealed fluid side becomes larger than a leakage amount and it is possible to suppress reduction in the sealing property.

Here, in a case of sealing oil at hydraulic pressure between 1 MPa and 2 MPa and if the oil is oil of poor lubricity (low viscosity) such as brake oil, for example, a lip tip end of a seal lip in a sealing device is formed by a curved face and rubber material of relatively low hardness (hardness of about 70 degrees) is employed as rubber material for the sealing device made of rubber, in general.

If the above-described prior art is applied to this case in order to reduce frictional resistance, the edge is formed between the side face of the annular groove and the sliding face and therefore a lubricant oil film is scraped off cleanly and it is difficult to obtain a lubricating effect. There are other related techniques as disclosed in Patent Literatures 2 and 3.

CITATION LIST

Patent Literatures

Patent Literature 1: Japanese Patent No. 2592489
Patent Literature 2: Japanese Patent Application Laid-Open No. 2008-101704
Patent Literature 3: Japanese Patent Application Laid-Open No. 2006-322528

SUMMARY OF INVENTION

Technical Problem

It is an object of the present invention to provide a sealing device in which frictional resistance is further reduced while a sealing property is maintained.

Solution to Problem

The present invention employs the following means to achieve the above-described object.

That is, according to the present invention, there is provided a sealing device for sealing an annular gap between two members reciprocating with respect to each other, wherein a seal lip extending toward a sealed fluid side and toward one of the two members to come in contact with a surface of the one member to be able to slide is provided. A plurality of annular grooves are provided to a first inclined face of the seal lip on an opposite side from the sealed fluid side at intervals from the sealed fluid side toward the opposite side, and curved faces are formed between a side face on the sealed fluid side and the first inclined face and between a side face on an opposite side from the sealed fluid side and the first inclined face in each of the annular grooves, a curved face is formed between a second inclined face on the sealed fluid side at a tip end of the seal lip and the first inclined face. In a section passing through a central axis of the annular sealing device, a radius of curvature of the curved face between the first inclined face and the second inclined face is larger than a radius of curvature of the curved face between the side face on the opposite side from the sealed fluid side and the first inclined face in each of the plurality of annular grooves and is smaller than a radius of curvature of the curved face between the side face on the sealed fluid side and the first inclined face in each of the plurality of annular grooves.

According to the invention, the curved face is formed between the side face of each of the annular grooves and the first inclined face and therefore oil on the surface of the one member is not cleanly scraped off in sliding and lubricity is maintained. Moreover, a relationship of the radius of curvature of the curved face between the side face on the opposite side from the sealed fluid side and the first inclined face in each of the plurality of annular grooves and the radius of curvature of the curved face between the side face on the sealed fluid side and the first inclined face in each of the plurality of annular grooves performs the function of returning the sealed fluid to the sealed fluid side. With the relationships between these radiuses of curvature and the radius of curvature of the curved face between the first inclined face and the second inclined face, it is possible to further suppress scraping off of the sealed fluid to the opposite side from the sealed fluid side.

Further, in the section passing through the central axis of the annular sealing device, the radius of curvature of the curved face between the side face on the opposite side from the sealed fluid side and the first inclined face in some of the annular grooves on the sealed fluid side out of the plurality of annular grooves may be smaller than the radius of curvature of the curved face between the side face on the opposite side from the sealed fluid side and the first inclined face in the other annular grooves.

In this way, the portions of some of the annular grooves on the sealed fluid side mainly perform the function of returning the sealed fluid to the sealed fluid side and the portions of the other annular grooves do not exert the function so much to maintain the lubricity of the entire sliding face.

When pressure from the sealed fluid side is not applied, portions of the first inclined face on both sides of the annular groove which is the closest to the sealed fluid side out of the plurality of annular grooves may come in close contact with the surface of the one member.

As a result, even when pressure is not applied or under low pressure, it is possible to maintain the lubricity and a sealing property.

The side face on the sealed fluid side in each of the plurality of annular grooves may be formed by a face inclined with respect to the first inclined face and connected to the side face on the opposite side from the sealed fluid side without a bottom face which is parallel to the first inclined face interposed therebetween.

In this way, it is possible to suppress close contact of the groove bottom faces of the annular grooves with the surface of the one member under high pressure or the like. As a result, it is possible to suppress unstable surface pressure distribution. Because a groove width of each of the annular grooves can be reduced as compared with a case in which the bottom face parallel to the first inclined face is provided, the annular grooves can be disposed more densely.

The above-described respective structures can be employed in combination wherever possible.

Advantageous Effects of Invention

As described above, with the invention, it is possible to further reduce the frictional resistance while maintaining the sealing property.

DESCRIPTION OF EMBODIMENTS

A mode for carrying out the present invention will be exemplarily described in detail below based on an embodiment with reference to the drawings. However, dimensions, materials, shapes, and relative positions of component parts described in the embodiment are not intended to restrict a scope of the invention to only themselves unless otherwise specified.

Embodiment

Figure 1:
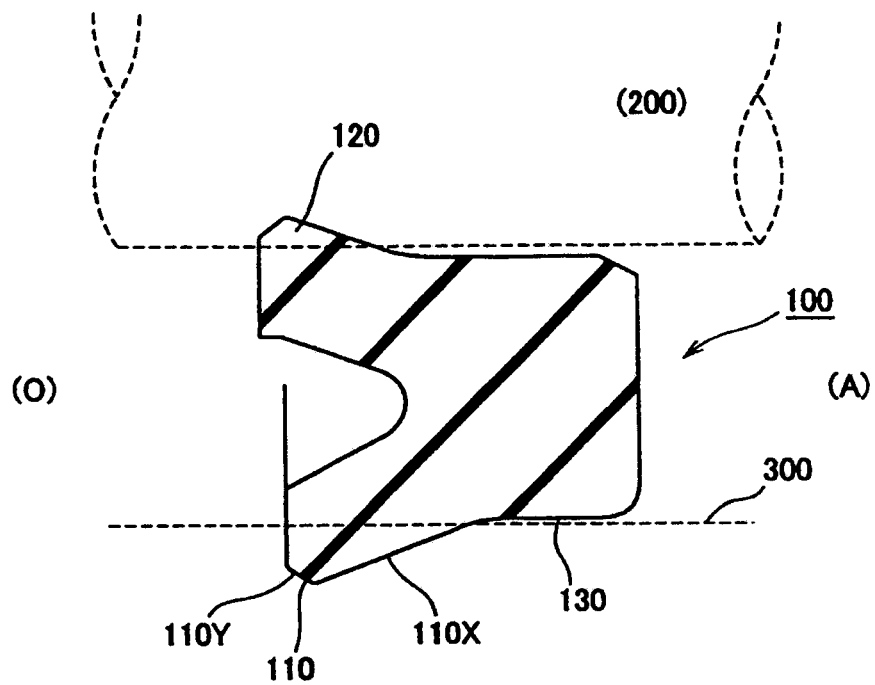
FIG. 1 is a schematic cross-sectional view of a sealing device according to an embodiment of the present invention.
Figure 2:
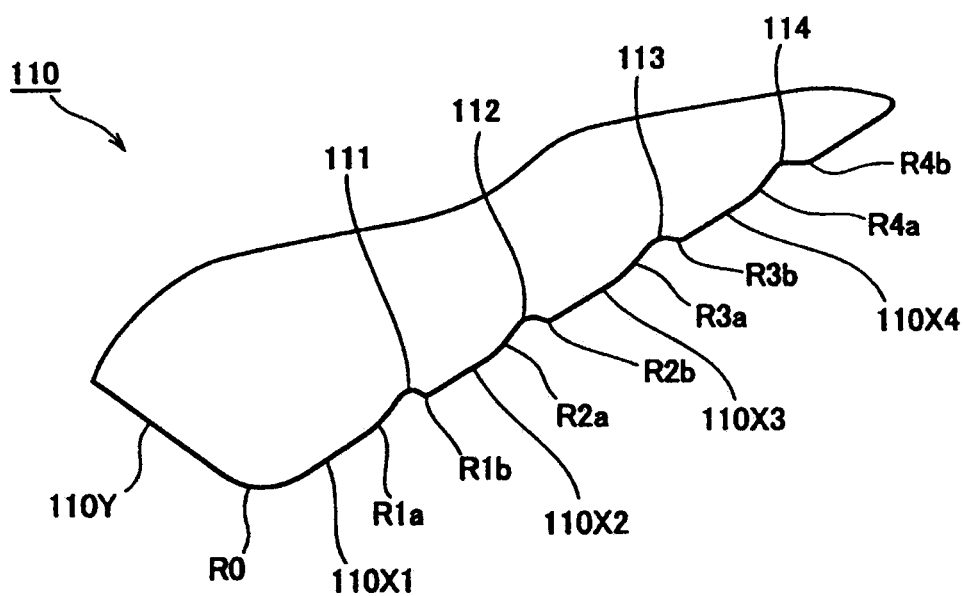
FIG. 2 is an enlarged cross-sectional view of a seal lip tip end of the sealing device according to the embodiment of the invention.

With reference to FIGS. 1 and 2, a sealing device according to the embodiment of the invention and made of a rubber-like elastic body will be described.
<Overall Structure of Sealing Device>

Especially with reference to FIG. 1, an overall structure of the sealing device according to the embodiment of the invention will be described. A sealing device 100 according to the embodiment is used to seal an annular gap between two members (e.g., a shaft 200 and a housing) reciprocating with respect to each other. In the embodiment, sealed fluid is oil and a left side in FIG. 1 is a sealed fluid side (O). In FIG. 1, a right side is an atmosphere side (A) on an opposite side from the sealed fluid side.

FIG. 1 schematically shows a cross-sectional view of the sealing device 100 taken along a plane passing through a central axis of the annular sealing device 100 when an external force is not applied on the sealing device 100. The sealing device 100 is in a rotationally symmetric shape and any section passing through the central axis is in the same shape. In FIG. 1, positions of an outer peripheral surface of the shaft 200 and an inner peripheral surface of a shaft hole 300 in the housing when the sealing device 100 is mounted are shown by dotted lines.

The sealing device 100 includes a first seal lip 110 for coming in contact with the inner peripheral surface of the shaft hole 300 so as to be able to slide and a second seal lip 120 for coming in contact with the outer peripheral surface of the shaft 200. The sealing device 100 has a substantially U-shaped cross-section and is also called U-packing. The sealing device 100 is disposed so that its side provided with the first seal lip 110 and the second seal lip 120 faces the sealed fluid side (O) as shown in FIG. 1. As is clear from FIG. 1, the first seal lip 110 extends toward the sealed fluid side (O) and the shaft hole 300 in the housing and is formed to come in contact with the inner peripheral surface of the shaft hole 300 to be able to slide.

The first seal lip 110 includes, at a lip tip end, a first inclined face 110X on the atmosphere side (A) and a second inclined face 110Y on the sealed fluid side (O). The first inclined face 110X is formed by a tapered face having a diameter increasing toward the sealed fluid side (O) and the second inclined face 110Y is formed by a tapered face having a diameter decreasing toward the sealed fluid side (O). An outer peripheral surface of the sealing device 100 on the atmosphere side (A) of the first seal lip 110 is formed by a cylindrical face 130. In other words, the cylindrical face 130 and the inner peripheral surface of the shaft hole 300 are formed parallel.
<First Seal Lip>

Especially, with reference to FIG. 2, the first seal lip 110 will be described in more detail.

In the first inclined face 110X of the first seal lip 110, a plurality of annular grooves are formed at intervals from the sealed fluid side (O) toward the atmosphere side (A). Here, for convenience of explanation, these plurality of annular grooves are referred to as the first annular groove 111, the second annular groove 112, the third annular groove 113, and the fourth annular groove 114, respectively.

Because these annular grooves are provided at intervals as described above, the first inclined face 110X (i.e., the tapered face) still exists. In FIG. 2, a portion of the first inclined face 110X on a tip end side of the first annular groove 111 is provided with a reference numeral 110X1, a portion between the first annular groove 111 and the second annular groove 112 is provided with 110X2, a portion between the second annular groove 112 and the third annular groove 113 is provided with 110X3, and a portion between the third annular groove 113 and the fourth annular groove 114 is provided with 110X4, respectively.

In each of these annular grooves, a curved face is formed between a side face on the sealed fluid side (O) and the first inclined face 110X. A curved face is formed also between a side face on the atmosphere side (A) and the first inclined face 110X in each of these annular grooves. Furthermore, a curved face is formed between the second inclined face 110Y at the tip end of the first seal lip 110 and first inclined face 110X as well.

Here, in a section taken along the central axis of the annular sealing device 100, radiuses of curvature of the above-described respective curved faces are defined as follows.

The radius of curvature of the curved face between the first inclined face 110X and the second inclined face 110Y is defined as R0. The radius of curvature of the curved face between the side face on the sealed fluid side (O) and the first inclined face 110X in the annular groove is R1$a$, R2$a$, R3$a$, and R4$a$ for the first annular groove 111, the second annular groove 112, the third annular groove 113, and the fourth annular groove 114, respectively. The radius of curvature of the curved face between the side face on the atmosphere side (A) and the first inclined face 110X in the annular groove is R1$b$, R2$b$, R3$b$, and R4$b$ for the first annular groove 111, the second annular groove 112, the third annular groove 113, and the fourth annular groove 114, respectively.

At this time, the sealing device 100 according to the embodiment is formed to satisfy the following expression.

R1b,R2b,R3b,R4b<R0<R1a,R2a,R3a,R4a    (Expression 1)

Although R1a=R2a=R3a=R4a in the embodiment, this is not an absolute necessity.

On the other hand, R1b, R2b, R3b, and R4b preferably satisfy either one of the following expressions.

R1b<R2b=R3b=R4b    (Expression 2)

R1b=R2b<R3b=R4b    (Expression 3)

R1a, R2a, R3a, and R4a are preferably set to the largest possible values.

In the embodiment, the portions 110X1 and 110X2 of the first inclined face on opposite sides of the first annular groove 111 which is the closest to the sealed fluid side (O) out of the plurality of annular grooves are formed to come in close contact with the inner peripheral surface of the shaft hole 300 when pressure from the sealed fluid side (O) is not applied. It is also possible that the portions 110X3 and 110X4 of the first inclined face located closer to the atmosphere side (O) may be formed to come in close contact with the inner peripheral surface of the shaft hole 300 and how many portions come in close contact with the inner peripheral surface of the shaft hole 300 when the pressure is not applied may be set properly according to a usage environment. However, as described above, at least the portions 110X1 and 110X2 of the first inclined face are formed to come inclose contact with the inner peripheral surface of the shaft hole 300.

In the embodiment, in each of the first annular groove 111, the second annular groove 112, the third annular groove 113, and the fourth annular groove 114, the side face on the sealed fluid side (O) is formed by a face inclined with respect to the first inclined face 110X and is connected to the side face on the atmosphere side (A) without a bottom face which is parallel to the first inclined face 110X interposed therebetween. Therefore, each of the annular grooves has a substantially triangular cross-sectional shape. Although the side face on the atmosphere side (A) is formed by the face inclined with respect to the first incline face 110X in each of the respective annular grooves in the embodiment, the face may be formed by a face perpendicular to the first inclined face 110X. In the embodiment, the side face on the sealed fluid side (O) and the side face on the atmosphere side (A) are connected by a curved face in each of the respective annular grooves.

In the embodiment, the first annular groove 111, the second annular groove 112, the third annular groove 113, and the fourth annular groove 114 have equal groove depths. It is preferable that the respective annular grooves have the equal groove depths from a viewpoint of machining of a metal mold, because the metal mold is easy to machine in this case. However, the groove depths do not necessarily have to be equal to each other.

Advantages of the Sealing Device According to the Embodiment

As described above, according to the sealing device 100 in the embodiment, the curved face is formed between each of the opposite side faces and the first inclined face 110X in each of the plurality of annular grooves formed in the first inclined face 110X of the first seal lip 110.

Therefore, when the first seal lip 110 and the inner peripheral surface of the shaft hole 300 slide on each other as the shaft 200 and the housing move with respect to each other, oil on the inner peripheral surface is not cleanly scraped off and lubricity is maintained.

From Expression (1) described above, the radiuses of curvatures of the respective curved faces (when seen in the cross-section) in the first seal lip 110 satisfy R1b, R2b, R3b, R4b<R1a, R2a, R3a, R4a. As a result, when the first seal lip 110 and the inner peripheral surface of the shaft hole 300 slide on each other, the function of returning the oil, which is the sealed fluid, to the sealed fluid side (O) is exerted and the sealing property is increased. Moreover, with the relationships between R0 and the other radiuses of curvature in Expression (1) described above, it is possible to further suppress the scraping of the oil out to the atmosphere side (A). In other words, from the relationship, R0<R1a, R2a, R3a, R4a, with regard to distribution of surface pressure (shifting of the surface pressure in an axial direction), an amount of change (a slope) of the surface pressure is smaller at each of the portions R1a, R2a, R3a, and R4a than at the portion R0 and therefore it is possible to suppress leakage of the oil from the portion R0 when the shaft 200 and the housing reciprocate with respect to each other.

As described above, in the respective annular grooves, Expression 2 or 3 described above is preferably satisfied. In this way, the portions of some of the annular grooves on the sealed fluid side (O) mainly exert the function of returning the oil, which is the sealed fluid, to the sealed fluid side (O) and the portions of the other annular grooves do not exert this function so much to maintain the lubricity of the entire sliding face. Expressions 2 and 3 described above are not necessarily restrictive, if the radius of curvature of the curved face between the side face on the atmosphere side (A) and the first inclined face 110X is set to a smaller value in each of some annular grooves on the sealed fluid side (O) out of the plurality of annular grooves and the radius of curvature is set to a larger value in each of the other annular grooves. For example, a relationship, R1b<R2b<R3b<R4b may be satisfied.

By setting R1a, R2a, R3a, and R4a to the largest possible values, it is possible to make a slope of the surface pressure small in the surface pressure distribution from the sealed fluid side (O) toward the atmosphere side (A), an oil film can be retained on the sliding portion even under high pressure, and lubricity can be maintained stably.

In the embodiment, the portions 110X1 and 110X2 of the first inclined face on the both sides of the first annular groove 111 are formed to come in close contact with the inner peripheral surface of the shaft hole 300 when the pressure from the sealed fluid side (O) is not applied. In this way, the lubricity and the sealing property are maintained, even when the pressure is not applied or under low pressure. In other words, the surface pressure can be dispersed in the above-described surface pressure distribution. Even if the first seal lip 110 and the inner peripheral surface of the shaft hole 300 slide on each other under low pressure, the function of returning the oil to the sealed fluid side (O) can be performed.

In the embodiment, in each of the plurality of annular grooves, the side face on the sealed fluid side (O) is formed by the face inclined with respect to the first inclined face 110X and is connected to the side face on the atmosphere side (A) without the bottom face which is parallel to the first inclined face 110X interposed therebetween. Therefore, under high pressure or the like, it is possible to suppress close contact of the groove bottom face of the annular groove with the inner peripheral surface of the shaft hole 300. In this way, it is possible to suppress unstable surface distribution. Because a groove width of each of the annular grooves can be reduced as compared with a case in which the bottom face parallel to the first inclined face is provided, the annular grooves can be disposed more densely.

In the embodiment, the outer peripheral surface of the sealing device 100 on the atmosphere side (A) of the first seal lip 110 is formed by the cylindrical face 130. Therefore, it is possible to smoothly return the oil, which has moved to the atmosphere side (A) of the first seal lip 110, to the sealed fluid side (O).

As described above, according to the sealing device 100 in the embodiment, even if the pressure is not applied or under high pressure, it is possible to stably maintain the oil film to reduce the frictional resistance while maintaining the sealing property. Therefore, even when the sealing device 100 is used under a relatively high-pressure environment, when the sealed fluid is oil having poor lubricity (low viscosity), or when the rubber material having relatively low hardness is used as material of the sealing device 100, the sealing device 100 according to the embodiment can be used suitably. In the sealing device 100 according to the embodiment, the seal lip is not pressed against an opposed sliding member by a spring or the like unlike in the technique disclosed in Patent Literature 1 and therefore contact pressure on the inner peripheral surface of the shaft hole 300 is low when the pressure of the sealed fluid is low, but the sealing property is maintained as described above. Although the plurality of annular grooves are formed in the seal lip for coming in contact with the inner peripheral surface of the shaft hole to be able to slide in the example described in the embodiment, the invention can be also applied to a case in which a plurality of annular grooves are formed in a seal lip for coming in contact with a shaft surface to be able to slide.

REFERENCE SIGNS LIST

100 Sealing device
110 First seal lip
110X First inclined face
110Y Second inclined face
111 First annular groove
112 Second annular groove
113 Third annular groove
114 Fourth annular groove
120 Second seal lip
130 Cylindrical face
200 Shaft
300 Shaft hole

The invention claimed is:

1. A sealing device for sealing an annular gap between two members reciprocating with respect to each other, comprising:
a seal body including a seal lip extending toward a sealed fluid side and toward one of the two members to come in contact with a surface of the one member to be able to slide is provided,
a plurality of annular grooves are provided to a first inclined face of the seal lip on an opposite side from the sealed fluid side at intervals from the sealed fluid side toward the opposite side,
curved faces are formed between a side face on the sealed fluid side and the first inclined face and between a side face on an opposite side from the sealed fluid side and the first inclined face in each of the annular grooves, a curved face is formed between a second inclined face on the sealed fluid side at a tip end of the seal lip and the first inclined face, and
in a section passing through a central axis of the annular sealing device, a radius of curvature of the curved face between the first inclined face and the second inclined face is larger than a radius of curvature of the curved face between the side face on the opposite side from the sealed fluid side and the first inclined face in each of the plurality of annular grooves and is smaller than a radius of curvature of the curved face between the side face on the sealed fluid side and the first inclined face in each of the plurality of annular grooves.

2. The sealing device according to claim 1, wherein, in the section passing through the central axis of the annular sealing device, the radius of curvature of the curved face between the side face on the opposite side from the sealed fluid side and the first inclined face in some of the annular grooves on the sealed fluid side out of the plurality of annular grooves is smaller than the radius of curvature of the curved face between the side face on the opposite side from the sealed fluid side and the first inclined face in the other annular grooves.

3. The sealing device according to claim 1, wherein, when pressure from the sealed fluid side is not applied, portions of the first inclined face on both sides of the annular groove which is the closest to the sealed fluid side out of the plurality of annular grooves come in close contact with the surface of the one member.

4. The sealing device according to claim 1, wherein the side face on the sealed fluid side in each of the plurality of annular grooves is formed by a face inclined with respect to the first inclined face and connected to the side face on the opposite side from the sealed fluid side without a bottom face which is parallel to the first inclined face interposed therebetween.

5. The sealing device according to claim 2, wherein, when pressure from the sealed fluid side is not applied, portions of the first inclined face on both sides of the annular groove which is the closest to the sealed fluid side out of the plurality of annular grooves come in close contact with the surface of the one member.

6. The sealing device according to claim 2, wherein the side face on the sealed fluid side in each of the plurality of annular grooves is formed by a face inclined with respect to the first inclined face and connected to the side face on the opposite side from the sealed fluid side without a bottom face which is parallel to the first inclined face interposed therebetween.

7. The sealing device according to claim 3, wherein the side face on the sealed fluid side in each of the plurality of annular grooves is formed by a face inclined with respect to the first inclined face and connected to the side face on the opposite side from the sealed fluid side without a bottom face which is parallel to the first inclined face interposed therebetween.

* * * * *